(12) United States Patent
Polli et al.

(10) Patent No.: US 9,731,286 B2
(45) Date of Patent: Aug. 15, 2017

(54) ALUMINA CATALYST SUPPORT

(75) Inventors: Andrew Polli, Washington Crossing, PA (US); Francis Francis, Columbia, MD (US); Thomas English, Parkesburg, PA (US); Naotaka Ohtake, Anan (JP); Olivier Larcher, Pennington, NJ (US)

(73) Assignee: Rhodia Operations, Aubervilliers (FR)

( * ) Notice: Subject to any disclaimer, the term of this patent is extended or adjusted under 35 U.S.C. 154(b) by 1426 days.

(21) Appl. No.: 13/373,522

(22) Filed: Nov. 16, 2011

(65) Prior Publication Data

US 2012/0122671 A1    May 17, 2012

Related U.S. Application Data

(60) Provisional application No. 61/458,035, filed on Nov. 16, 2010.

(51) Int. Cl.
*B01J 21/00* (2006.01)
*B01J 23/00* (2006.01)
*B01J 25/00* (2006.01)
*B01J 29/00* (2006.01)
*B01J 37/03* (2006.01)
*B01J 21/12* (2006.01)
*B01J 23/38* (2006.01)
(Continued)

(52) U.S. Cl.
CPC .......... *B01J 37/038* (2013.01); *B01D 53/945* (2013.01); *B01J 21/12* (2013.01); *B01J 23/38* (2013.01); *B01J 23/44* (2013.01); *B01J 23/63* (2013.01); *B01J 35/1019* (2013.01); *B01J 35/1047* (2013.01); *B01J 35/1061* (2013.01); *B01J 37/0045* (2013.01); *B01D 2255/102* (2013.01); *B01D 2255/2063* (2013.01); *B01D 2255/2092* (2013.01); *B01D 2255/30* (2013.01); *B01D 2255/9205* (2013.01); *B01D 2255/9207* (2013.01); *B01J 21/063* (2013.01); *B01J 21/066* (2013.01); *B01J 23/42* (2013.01); *B01J 37/031* (2013.01); *B01J 37/04* (2013.01); *B01J 37/08* (2013.01); *Y02T 10/22* (2013.01)

(58) Field of Classification Search
USPC ................ 502/263, 439, 355, 100, 232, 240
See application file for complete search history.

(56) References Cited

U.S. PATENT DOCUMENTS

RE32,392 E  *  4/1987  Clark ....................... B01J 23/70
                                                          210/763
4,886,935 A    12/1989  Kokayeff et al.
(Continued)

FOREIGN PATENT DOCUMENTS

CA    2711392 A1    7/2009
CN    1592653 A     3/2005
(Continued)

*Primary Examiner* — James McDonough

(57) ABSTRACT

The present invention is directed to a high surface area, high pore volume porous alumina, comprising: aluminum oxide, optionally, silicon oxide and aluminosilicates, and optionally one or more dopants, said alumina having a specific surface area of from about 100 to about 500 square meters per gram and a total pore volume after calcination at 900° C. for 2 hours of greater than or equal to 1.2 cubic centimeters per gram, wherein less than or equal to 15% of the total pore volume is contributed by pores having a diameter of less than 10 nm.

11 Claims, 17 Drawing Sheets

(51) Int. Cl.

| | | |
|---|---|---|
| *B01J 23/44* | (2006.01) | |
| *B01J 23/63* | (2006.01) | |
| *B01J 35/10* | (2006.01) | |
| *B01J 37/00* | (2006.01) | |
| *B01D 53/94* | (2006.01) | |
| B01J 37/04 | (2006.01) | |
| B01J 21/06 | (2006.01) | |
| B01J 23/42 | (2006.01) | |
| B01J 37/08 | (2006.01) | |

(56) References Cited

U.S. PATENT DOCUMENTS

| | | | |
|---|---|---|---|
| 5,106,812 A * | 4/1992 | Yamaguchi | B01J 21/12 |
| | | | 502/439 |
| 6,045,689 A | 4/2000 | Alario et al. | |
| 6,251,823 B1 | 6/2001 | Yamaguchi et al. | |
| 6,589,908 B1 | 7/2003 | Ginestra et al. | |
| 8,076,263 B2 * | 12/2011 | Koranne | B01J 21/12 |
| | | | 502/261 |
| 8,809,216 B2 | 8/2014 | Long et al. | |
| 2005/0143256 A1 * | 6/2005 | Wei | B01J 21/12 |
| | | | 502/202 |
| 2010/0270210 A1 | 10/2010 | Long et al. | |

FOREIGN PATENT DOCUMENTS

| | | |
|---|---|---|
| WO | 02/43862 A2 | 6/2002 |
| WO | 2008045175 A1 | 4/2008 |
| WO | 2009092282 A1 | 7/2009 |

* cited by examiner

ALUMINA CATALYST SUPPORT

FIELD OF THE INVENTION

This invention relates to a method for making an alumina that is suitable for application as a catalyst support in treating of exhaust products from internal combustion engines.

BACKGROUND OF THE INVENTION

The exhaust products of internal combustion engines are known health hazards to human beings, animals as well as plant life. The pollutants are, in general, non-burnt hydrocarbons, carbon monoxide, nitrogen oxides, as well as residual amounts of sulfur and sulfurous compounds. Exhaust catalysts have to meet stringent requirements with respect to light-off performance, effectiveness, long-term activity, mechanical stability as well as cost effectiveness in order to be suitable for vehicle application. The pollutants of non-burnt hydrocarbons, carbon monoxides as well as nitrogen oxides have been successfully treated by contact with multifunctional, noble metal catalysts which are capable of converting a high percentage of the pollutants into less harmful products of carbon dioxide, water (steam) and nitrogen. However, the sulfur and sulfurous compounds present in fuels and, in turn, in exhaust product, have been known to poison the noble metals resulting in lessening their catalytic effectiveness and life.

The "catalytic converter" used to convert the harmful pollutants into non-harmful gases, usually consists of three components, that is, the catalytically active metal, the support on to which the active metal is dispersed, and a substrate on to which the support is applied or "washcoated".

The catalytic metals that are useful to cause effective conversion of harmful pollutants, like carbon monoxide, nitrogen oxides, and non-burnt hydrocarbons under the varying conditions encountered, are noble metals, usually the metals of the platinum group, such as platinum, palladium, rhodium and mixtures thereof. These noble metal catalysts are well known in the art and are more fully described in, for example, DE-05 38 30 318.

The noble metal is typically supported on high surface area inorganic oxides, such as high surface area alumina particles. The high surface area alumina is applied or "washcoated" onto a ceramic or metallic substrate, such as in the form of a honeycomb monolith or wire mesh or the like structure. It is also possible to apply the noble metals onto the support after washcoating the support material onto the monolith.

Nanocrystalline alumina is used as a catalyst support due to its high specific surface area and good thermal resistance to coarsening and sintering at elevated temperatures. However, alumina undergoes a strong interaction with sulfur and sulfurous compounds present in fuels and, in turn, in exhaust product, which results in the storage of $SO_4^-$ at the surface of alumina. When so adsorbed, the sulfurous compounds are known to poison noble metal catalysts, especially those formed with platinum metal, causing reduction in activity and effective life of the catalyst system.

Silica has little interaction with sulfur and sulfurous compounds and does not show the ability to store sulfate. However, silica does not exhibit the hydrothermal stability required to form effective emission control catalyst supports and, therefore, is not a desirable catalyst support material for such applications. As such, it has been found to be desirable to modify the alumina surface with silica in order to combine the structural characteristics of alumina and chemical characteristics of silica.

WO 2008/045175 discloses a structure comprising a porous alumina particulate having silica cladding on its surface made by forming an alumina particulate into an aqueous slurry, mixing a silica precursor material with the slurry, treating the mixture with acid to form an aqueous suspension of treated alumina particles, washing the suspension to remove alkali metal materials, spray drying the suspension to provide dry particles, and then and calcining the dry particles to form a high surface area alumina having silica cladding on its surface.

It is desired to form an alumina catalyst support that is capable of enhancing the activity of noble metals in the conversion of carbon monoxide and hydrocarbon materials to carbon dioxide and water while exhibiting high tolerance to the presence of sulfur and sulfurous compounds by a simpler process.

It is further desired to form an alumina catalyst support capable of enhancing the activity of noble metals, especially platinum metal, to convert noxious emission products of internal combustion engines, especially diesel engines, to more environmentally benign products and to exhibit such activity over an extended life because of its enhance tolerance to the presence of sulfur and sulfurous compounds and to provide improved properties compared to prior alumina catalyst support materials.

SUMMARY OF THE INVENTION

In a first aspect, the present invention is directed to a high surface area, high pore volume porous alumina, comprising:
  aluminum oxide,
  optionally, silicon oxide and aluminosilicates, and
  optionally one or more dopants,
said alumina having a specific surface area of from about 100 to about 500 square meters per gram and a total pore volume after calcination at 900° C. for 2 hours of greater than or equal to 1.2 cubic centimeters per gram, wherein less than or equal to 15% of the total pore volume is contributed by pores having a diameter of less than 10 nm.

In one embodiment, the porous alumina according to the first aspect of the present invention comprises silicon oxide and aluminosilicates and exhibits reduced adsorption of sulfur compounds.

In a second aspect, the present invention is directed to a catalyst, comprising:
(a) a porous alumina according to the first aspect of the present invention, and
(b) a noble metal dispersed on the sulfur tolerant, high surface area, high pore volume porous alumina.

In a third aspect, the present invention is directed to a method for making a high surface area, high pore volume porous alumina, comprising:
  forming a slurry of aluminum hydrate particles in an aqueous medium at a pH of from about 4 to less than 6,
  adjusting the pH of the slurry of aluminum hydrate particles in the aqueous medium to a pH of from about 8 to less than 11,
  isolating aluminum hydrate particles from the aqueous medium,
  drying the isolated aluminum oxide particles,
  calcining the dried aluminum oxide particles to form the high surface area, high pore volume porous alumina.

The sulfur tolerant alumina made by the method of the present invention exhibits high surface area, high specific pore volume, and high average pore diameter, wherein a relatively small fraction of the total pore volume is contributed by small pores, exhibits good thermal stability as well as low adsorption of sulfur compounds, and provides a highly desired support for noble metal catalyst application. The resultant catalyst product exhibits enhanced activity in treating noxious emission products of internal combustion engines, especially diesel engines while having an extended active period due to its enhanced tolerance to sulfur and sulfurous products.

DETAILED DESCRIPTION OF THE INVENTION

Figure 1:
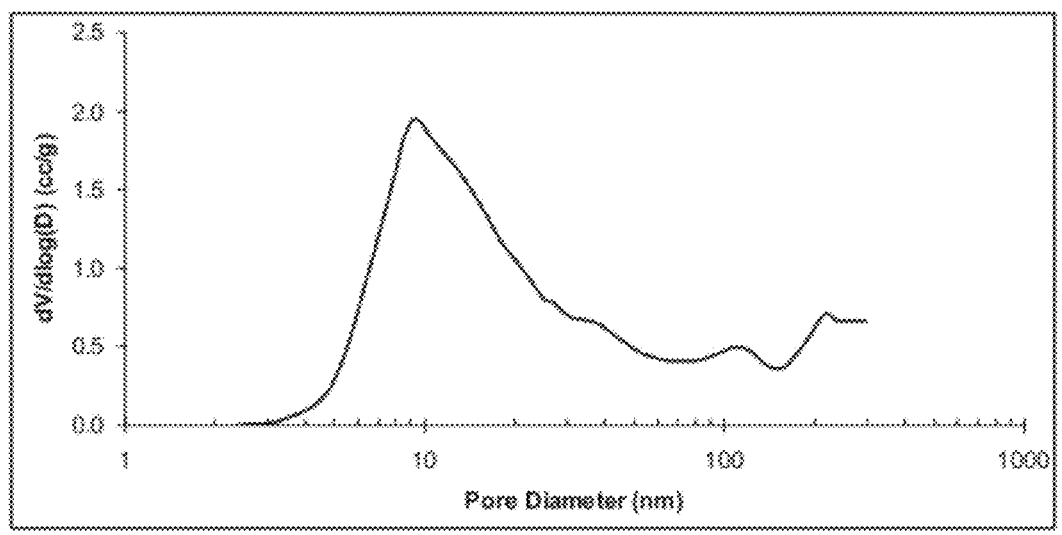
FIG. 1 shows a logarithmic derivative plot of pore size distribution, as measured by nitrogen porosimetry for the sulfur resistant alumina composition of Comparative Example C1 after calcination at 1050 degrees Centigrade ("° C.") for 2 hours. In each case, the derivative logarithmic plots of pore size distribution provided herein show a plot of dV/d(log D), where "V" is pore volume, given in cubic centimeters per gram ("$cm^3/g$") or milliliters per gram ("ml/g"), and "D" is pore size (diameter or width), given in nanometers ("nm") or micrometers "microns").

The present invention is directed to an improved alumina support for forming noble metal catalysts. In one embodiment, the alumina support is a sulfur tolerant alumina that is useful in forming an exhaust catalyst having increased tolerance to the presence of sulfur normally found in emission product streams of internal combustion engines and the like and, thereby, achieves lower poisoning of the noble metal of the resultant catalyst than with catalysts utilizing conventionally formed supports.

The support of the present invention is generally in the form of particulate comprising alumina having a cladding of silica thereon.

The following terms, used in the present description and the appended claims, have the following definitions:

The term "particulate" refers to shaped particles in the form of powder, beads, extradite, and the like. In this teaching, it is used in reference to cores, supports as well as the resultant supported noble metal products.

The term "alumina" refers to any of the forms of aluminum oxide alone or as a mixture with small amounts of other metal and/or metal oxides.

The term "silica-clad" refers to the silica-rich surface of the high surface area alumina particulate of the present invention.

The term "adsorbed" or "adsorption" shall refer collectively to the phenomena of adsorption (the ability to hold or concentrate gases, liquid or dissolved substances on the surface of the adsorbent, e.g. alumina), and absorption (the ability to hold or concentrate gases, liquids or dissolved substances throughout the body of the absorbent, e.g. alumina); either by chemical reaction which may be ionic, covalent or of mixed nature or by physical forces.

The term "sulfurous material" refers to sulfur, sulfur oxides and compounds containing sulfur atoms.

In one aspect, the present invention is directed to a method for making a high surface area alumina particulate and to a high surface area alumina particulate (each referred to an "alumina" embodiment of the present invention). In an alternative aspect, the present invention is directed to a method for making a sulfur tolerant high surface area alumina particulate having a silica cladding thereon and to a sulfur tolerant high surface area alumina particulate having a silica cladding thereon (each referred to a "sulfur tolerant alumina" or "silica-clad alumina" embodiment of the present invention). Each of such embodiments is fully described herein below.

It has now been found that alumina particulate can be clad with silica to provide a support that exhibits a high tolerance to the presence of sulfurous materials and, thereby, provides a catalyst having an extended useful life for emission control. The formation of silica clad alumina particulate has been accomplished by the application of certain specific combination of process parameters, as fully described herein below.

As referred to herein, an aqueous medium is a medium comprising water and which may optionally further comprise one or more water soluble organic solvents such as for example, lower alcohols, such as ethanol, lower glycols, such as ethylene glycol, and lower ketones, such as methyl ethyl ketone.

Hydrated aluminum oxide, such as, for example, boehmite, gibbsite, or bayerite, or a mixture thereof, is formed in an aqueous medium. The hydrated aluminum oxide can be formed in the aqueous medium from water soluble aluminum salts by a variety of known methods, such as, for example, by adding ammonium hydroxide to an aqueous solution of an aluminum halide, such as aluminum chloride, or by reacting aluminum sulfate with an alkali metal aluminate, such as sodium aluminate, in the aqueous medium. Suitable water soluble aluminum salts comprise an aluminum cation, such as $Al^{3+}$, and a negatively charged counterion or an aluminum-containing anion, such as $Al(OH)_4^-$, and a positively charged counterion. In one embodiment, the water soluble water aluminum salts comprise one or more water soluble aluminum salts that each independently comprise an aluminum cation and a negatively charged counterion, such as, for example aluminum halide salts or aluminum sulfate salts. In another embodiment, the water soluble aluminum salts comprise one or more water soluble aluminum salts that each independently comprise an aluminum anion and a positively charged counterion, such as for example, water soluble alkali metal aluminate salts. In another embodiment, the water soluble aluminum salts comprise one or more water soluble aluminum salts that each independently comprise an aluminum cation and a negatively charged counterion, and one or more water soluble aluminum salts that each independently comprise an aluminum anion and a positively charged counterion.

In one embodiment, a water soluble aluminum precursor is introduced into the reactor in the form of an aqueous solution of the water soluble aluminum precursor. The acidity of such aluminum precursor solution can optionally be adjusted over a wide range, through addition of acid or base. For example, an acid, such as nitric acid, chloridric acid, sulfuric acid, or a mixture thereof, may be added to increase the acidity of an aluminum sulfate or aluminum chloride solution or a base, such as sodium hydroxide, potassium hydroxide or a mixture thereof, may be added to decrease the acidity of a sodium aluminate solution. In one embodiment, the acidity of the aluminum precursor solution is adjusted prior to introduction of the precursor solution into the reactor by adding acid to the aluminum precursor solution. In one embodiment, the acidity of the aluminum precursor solution is adjusted prior to introduction of the precursor solution into the reactor by adding base to the aluminum precursor solution In one embodiment, aluminum hydrate seeds are first formed at an acidic pH in a very dilute aqueous system and more aluminum hydrate is then deposited on the seed crystals at a pH of from about 3 to about 6.

In one embodiment, aluminum hydrate seeds are formed by reacting aluminum sulfate and sodium aluminate in an aqueous medium at a pH of from about 2 to about 5 in a reaction vessel and more aluminum hydrate is deposited on the seeds by simultaneously feeding aqueous streams of aluminum sulfate and sodium aluminate into the reaction vessel while allowing the pH of the aqueous medium to gradually increase to a pH of from about 3 to about 6, more typically from about 5 to about 6. The temperature of the aqueous medium during formation of hydrated aluminum oxide is typically in the range of from about 30° C. to about 100° C., more typically from about 50° C. to about 100° C.

In one embodiment, aluminum hydrate seeds are formed by reacting aluminum sulfate and sodium aluminate in an aqueous medium at a pH of from about 2 to about 5 in a reaction vessel and more aluminum hydrate is deposited on the seeds by simultaneously feeding aqueous streams of aluminum sulfate and sodium aluminate into the reaction vessel while allowing the pH of the aqueous medium to gradually increase to a pH of from about 3 to about 6, more typically from about 4 to about 5. The temperature of the aqueous medium during formation of hydrated aluminum oxide is typically in the range of from about 30° C. to about 100° C., more typically from about 50° C. to about 100° C., even more typically from about 55° C. to 100° C., and still more typically from 60° C. to 95° C. It has been found that the particles of aluminum hydrate or silica precursor-contacted particles of aluminum hydrate of the alternative embodiment tend to exhibit, after calcining, high specific pore volume wherein the pore volume fraction contributed by small diameter pores is low.

In one embodiment, aluminum hydrate seeds forming is omitted and aluminum hydrate is directly formed by simultaneously feeding aqueous streams of aluminum sulfate and sodium aluminate into the reaction vessel while allowing the pH of the aqueous medium to gradually increase to a pH of from about 3 to about 6, more typically from about 4 to about 5. The temperature of the aqueous medium during formation of hydrated aluminum oxide is typically in the range of from about 30° C. to about 100° C., more typically from about 50° C. to about 100° C., even more typically from about 55° C. to 100° C., and still more typically from 60° C. to 95° C. It has been found that the particles of aluminum hydrate or silica precursor-contacted particles of aluminum hydrate of the alternative embodiment tend to exhibit, after calcining, high specific pore volume wherein the pore volume fraction contributed by small diameter pores is low.

In one embodiment, precipitation of particles of aluminum hydrate from the aqueous medium is continued, typically by allowing the pH of the aqueous medium to increase to about 8 to 10, more typically from about 8.5 to about 9.5, to form a slurry of aluminum hydrate particles suspended in the aqueous medium. In one embodiment, wherein an aluminum hydrate is formed by simultaneously feeding streams of aqueous aluminum sulfate and aqueous sodium aluminate to the reaction vessel, the particles of aluminum hydrate may be precipitated by discontinuing the feed of the aluminum sulfate stream, while continuing the feed of the sodium aluminate stream and allowing the pH of the reaction medium to increase with the continued addition of sodium aluminate to the reaction vessel. Sodium hydroxide or any alkali solution could be used also to increase the pH of the solution. The amount of aluminum hydrate particles formed is typically in the range of from about 3 to about 50 parts by weight ("pbw") of hydrated aluminum oxide particles per 100 pbw of the slurry. The temperature of the aqueous medium during precipitation of aluminum hydrate particles is typically in the range of from about 30° C. to about 100° C., more typically from about 50° C. to about 100° C., even more typically from about 55° C. to 100° C., and still more typically from 60° C. to 95° C. The aqueous medium in which the aluminum hydrate is formed contains the counterions of the water soluble aluminum salts from which the aluminum hydrate is made.

In the sulfur tolerant alumina embodiments of the present invention, the particles of aluminum hydrate are contacted with a water soluble silica precursor in the aqueous medium. The aluminum hydrate may be formed prior to introduction of the silica precursor or may be formed simultaneously with introduction of the silica precursor. Suitable silica precursor compound include, for example, alkylsilicates, such as tetramethylorthosilicate, silicic acids, such as metasilicic acid or orthosilicic acid, and alkali metal silicates such as sodium silicate or potassium silicate. More typically the silica precursor is selected from alkali metal silicates and mixtures thereof. Even more typically, the silica precursor comprises sodium silicate.

In one embodiment, a water soluble silica precursor is introduced into the reactor in the form of an aqueous solution of the water soluble silica precursor. The pH of such silica precursor solution can optionally be adjusted within a wide range, through addition of acid or base. For example, nitric, chloridric, or sulfuric acid can be added to decrease the pH of an alkali metal silicate solution to a desired value and sodium hydroxide or potassium hydroxide can be added to increase the pH of a silicic acid solution to a desired value. In one embodiment, the silica precursor solution is neutralized to a pH of about 7 prior to introduction of the precursor solution into the reactor by adding acid to an initially basic silica precursor solution, or through adding base to an initially acidic silica precursor solution.

In one embodiment, a stream of aqueous sodium silicate is fed into the reaction vessel and mixed with an aqueous slurry of aluminum hydrate particles to contact the sodium silicate with the particles. The temperature of the aqueous medium during addition of the source of silica ions is typically in the range of from about 30° C. to about 100° C., more typically from about 50° C. to about 100° C., even more typically from about 55° C. to 100° C., and still more typically from 60° C. to 95° C.

The contacting of the aluminum hydrate with the silica precursor material is conducted in the aqueous medium and in the presence of the counterions of the one or more water soluble aluminum salts. In one embodiment, one or more species of negatively charged counterions, such as halide anions or sulfate anions, are present in the aqueous medium. In one embodiment, one or more species of positively charged counterions, such as alkali metal cations, are present in the aqueous medium. In one embodiment, one or more species of negatively charged counterions and one or more species of positively charged counterions are each present in the aqueous medium.

The silica precursor material may be introduced in a batch mode or in a continuous mode. In one embodiment of a batch mode process, the charge of silica precursor is introduced to a reaction vessel containing the aluminum hydrate and aqueous medium while the contents of the reaction vessel are mixed. (In another embodiment of a batch mode process, the charge of silica precursor is introduced to a reaction vessel simultaneously with the charge of water soluble aluminum salts and the contents of the reaction vessel are mixed). In one embodiment of a continuous process, a stream of an aqueous suspension of aluminum hydrate a and stream of an aqueous solution of silica precursor are simultaneously fed to an in-line mixing device.

The amount of silica precursor used to contact the aluminum hydrate should be sufficient to provide a silica clad alumina product having from a silica content of from about 1 to about 40 pbw silica ($SiO_2$), more typically from about 5 to about 30 pbw silica per 100 pbw of the silica clad alumina. Typically, the silica precursor is introduced to the aqueous medium in the form of an aqueous stream comprising from about 1 to about 40, more typically from about 3 to about 30 pbw, more typically from about 4 to 25 pbw silica, as $SiO_2$, per 100 pbw of the aqueous stream of silica precursor. In one embodiment, the silica precursor is water soluble and the aqueous stream of silica precursor is an aqueous solution of the silica precursor. In one embodiment, the aqueous stream of silica precursor further comprises one or more surfactants to facilitate dispersal of the silica precursor in the aqueous feed stream. Typically, the aqueous stream of silica precursor is heated prior to introduction into the reaction vessel to a temperature substantially the same as that of the aqueous medium within the reaction vessel, but preheating is not required.

In embodiment, the mixture of suspended aluminum hydrate particles and silica precursor is heated to a temperature above ambient temperature, more typically to a temperature of from about 50° C. to about 200° C. for a time period of from about 20 minutes to about 6 hours, more typically from about 20 minutes to about 1 hour. For temperatures greater than 100° C., the heating is conducted in a pressure vessel at a pressure of greater than atmospheric pressure.

The particles of aluminum hydrate or silica precursor-contacted aluminum hydrate are then isolated from the aqueous medium, typically by filtration. In one embodiment, prior to isolation of the particles from the aqueous medium, the pH of the suspension of silica precursor-contacted aluminum hydrate particles in the aqueous medium is adjusted to a pH of from about 4 to about 10, by the introduction of acid, typically an acid comprising nitric acid, sulfuric acid, or acetic acid, to the suspension.

In one embodiment, the particles of aluminum hydrate or silica precursor-contacted aluminum hydrate are washed to remove residues, including, in the case where the alumina is made from an alkali metal aluminate and/or the silica precursor is an alkali metal silicate alkali metal residues, of the forming, precipitating, and contacting steps. In one embodiment, prior to isolation of the particles from the aqueous medium, one or more water soluble salts are added to the suspension of particles in the aqueous medium in order to improve washing efficiency. Suitable water soluble salts include, for example, ammonium nitrate, ammonium sulfate, ammonium hydroxide, ammonium carbonate, potassium carbonate, sodium carbonate, aluminum bicarbonate, and mixtures thereof.

The washing may be conducted using hot water and/or an aqueous solution of a water-soluble ammonium salt such as, for example, ammonium nitrate, ammonium sulfate, ammonium hydroxide, ammonium carbonate, potassium carbonate, sodium carbonate, ammonium bicarbonate, and the like or mixtures thereof. In one embodiment of the washing step, the slurry of aluminum hydrate particles or silica-clad aluminum hydrate particles is dewatered, then washed with an aqueous solution of water-soluble ammonium salt, then dewatered, then washed with water, and then dewatered again to form a wet cake of washed particles.

In one embodiment, the wet cake of washed particles of aluminum hydrate or silica precursor-contacted aluminum hydrate is re-dispersed in water to form a second aqueous slurry.

In one embodiment, the second aqueous slurry is then spray dried to particles of aluminum hydrate or silica precursor-contacted aluminum hydrate. In another embodiment, the pH of the second aqueous slurry is adjusted to a pH of from about 4 to about 10, more typically of from about 6 to about 8.5, by the introduction of acid, such as the acids mentioned above in regard to adjustment of the pH of the suspension of particles of aluminum hydrate or silica precursor-contacted aluminum hydrate in the aqueous medium, or of base, such as sodium hydroxide, to the second aqueous slurry. In one embodiment, the pH adjusted second slurry is then heated to a temperature above ambient temperature, more typically to a temperature of from about 50° C. to about 200° C., even more typically to a temperature of from about 80° C. to about 200° C. for a time period of from about 20 minutes to about 6 hours, more typically from about 20 minutes to about 1 hour. For temperatures greater than 100° C., the heating is conducted in a pressure vessel at a pressure of greater than atmospheric pressure. The particles of aluminum hydrate or silica precursor-contacted aluminum hydrate of the pH adjusted second slurry are then isolated from the aqueous medium of the second slurry. In one embodiment, the particles of aluminum hydrate or silica precursor-contacted aluminum hydrate isolated from the second slurry are redispersed in water to form a third aqueous slurry and the third aqueous slurry is spray dried.

The isolated or the isolated, redispersed, and spray dried particles of aluminum hydrate or silica precursor-contacted aluminum hydrate are then calcined to form the desired alumina or silica-clad alumina product. In one embodiment, the particles of aluminum hydrate or silica precursor-contacted aluminum hydrate are calcined at elevated temperature, typically from 400° to 1100° C., for greater than or equal to about 30 minutes, more typically from about 1 to about 5 hours, to form the alumina or silica-clad alumina product. The calcination can be conducted in air, or nitrogen, optionally in the presence of up to about 20% water vapor. Unless otherwise indicated, the specific calcination conditions described herein refer to calcination in air.

In one embodiment, the particles of aluminum hydrate or silica precursor-contacted aluminum hydrate are calcined at greater than or equal to 400° C., more typically from about 600 to about 1100° C. for greater than or equal to 1 hour, more typically from about 2 to about 4 hours, to form an alumina or a silica-clad alumina having high specific pore volume, typically a total pore volume of greater than or equal to 1.5 centimeters per gram, ("cm/g"), more typically greater than or equal to 1.7 cm/g, of predominantly large diameter pores, typically wherein the volume fraction of pores having a pore diameter smaller than 10 nm is less than or equal to 15%, more typically less than or equal to 10%, of the total pore volume of the particles. In one embodiment, after calcination at 1050° C. for 2 hours, the silica-clad alumina particles exhibit a total pore volume of greater than or equal to 1.5 cm/g and the volume fraction contributed by pores smaller than 10 nm is less than or equal to 15%, more typically less than or equal to 10%, of the total pore volume of the particles. In another embodiment, after calcination at 1050° C. for 2 hours, the silica-clad alumina particles exhibit a total pore volume greater than or equal to 1.7 cm/g and the volume fraction contributed by pores smaller than 10 nm is less than or equal to 15%, more typically less than or equal to 10%, of the total pore volume of the particles. Surface area, pore size distribution, pore diameter, and pore volume are each determined by know size distribution, pore diameter, and pore volume are each determined by know techniques, typically by nitrogen adsorption.

In one embodiment, the high surface area, high pore volume porous alumina of the present invention comprises aluminum oxide and has a specific surface area of from about 100 to about 500 square meters per gram and a total pore volume after calcination at 900° C. for 2 hours of greater than or equal to 1.2 cm$^3$/g, wherein less than or equal to 15% of the total pore volume is contributed by pores having a diameter of less than 10 nm.

In one embodiment, the sulfur tolerant porous alumina of the present invention comprises, expressed as parts by weight of the respective oxides of the discrete elements, that is, the oxides of aluminum, silicon, and any optional dopant elements, per 100 parts by weight of the combined amount of the respective oxides of the discrete elements of the porous alumina, from about 60 to about 98 parts by weigh aluminum oxide, from about 2 to about 40 parts by weigh silicon oxide, and.

optionally, one or more dopants selected from transition metal oxides, rare earth oxides, and mixtures thereof.

The alumina of the present invention may, optionally, be doped with conventional dopants, such as transition metals and metal oxides, alkaline earth metal and metal oxides, rare-earths and oxides, and mixtures thereof. A dopant, when used, is normally present in small amounts, such as from 0.1 to 20 parts by weight, typically from 1 to 15 parts by weight per 100 parts by weight alumina. Such dopants are used in the alumina particulates to impart particular properties, such as hydrothermal stability, abrasion strength, catalytic activity promotion and the like, as is well known to the artisan.

Suitable dopants include transition metals, such as, for example yttrium, zirconium, and titanium, as well as oxides thereof, alkaline earth metals, such as, for example, beryllium, magnesium, calcium, and strontium, as well as oxides thereof, and rare earth elements, such as, for example, lanthanum, cerium, praseodymium, and neodymium, as well as oxides thereof. A given dopant is typically introduced to the sulfur tolerant alumina of the present invention by adding a dopant precursor, typically a water soluble salt of the desired dopant, to the reaction vessel during the above described formation of the hydrated aluminum oxide portion of the alumina or sulfur tolerant alumina. Suitable dopant precursors include, for example, rare earth chlorides, rare earth nitrates, rare earth acetates, zirconium nitrate, zirconium oxychloride, zirconium sulfate, zirconium orthosulfate, zirconium acetate, zirconium lactate, zirconium ammonium carbonate, titanium chloride, titanium oxychloride, titanium acetate, titanium sulfate, titanium lactate, titanium isopropoxide, cerous nitrate, ceric nitrate, cerous sulfate, ceric sulfate, ceric ammonium nitrate, and mixtures thereof.

In one embodiment, the high surface area, high pore volume porous alumina of the present invention comprises aluminum oxide and one or more dopants, said alumina having a specific surface area of from about 100 to about 500 square meters per gram and a total pore volume after calcination at 900° C. for 2 hours of greater than or equal to 1.2 cm$^3$/g, wherein less than or equal to 15% of the total pore volume is contributed by pores having a diameter of less than 10 nm.

In one embodiment, the sulfur tolerant porous alumina of the present invention comprises, expressed as parts by weight of the respective oxides of the discrete elements per 100 parts by weight of the combined amount of the respective oxides of the discrete elements of the porous alumina, from about 60 to about 98 parts by weigh aluminum oxide, and from about 2 to about 40 parts by weigh silicon oxide, and greater than 0 pbw of one or more dopants selected from transition metal oxides, rare earth oxides, and mixtures thereof.

Dopants can also be introduced as a colloidal dispersion in a solvent, the solvent might contain additional ions for dispersion stabilization. To ensure good stability of the dopant colloidal suspension and to obtain high dispersion of the dopant within the alumina body, the size of the colloids is preferably between 1 and 100 nm. The solution may contain simultaneously the dopant in the form of colloidal particles and ionic species.

In one embodiment, a dopant is introduced by adding a dopant precursor, typically in the form of an aqueous solution of the dopant precursor, either as a separate feed stream or by mixing the dopant precursor solution with one of the feed containing aluminium precursor, to the reaction vessel during formation of the hydrated aluminum hydrate particles.

In another embodiment, a dopant is introduced by adding a dopant precursor, typically in the form of an aqueous solution of the dopant precursor, to the reaction vessel after formation of the hydrated aluminum oxide particles. In this case, it the pH of the aqueous slurry of hydrated aluminum oxide particles is typically adjusted to a pH of from about 4 to about 9 with acid, such as nitric acid, sulfuric acid, or acetic acid, prior to the addition of the dopant precursor solution. The dopant precursor solution is then added to the reaction vessel under continuous agitation. After this addition is complete, the pH is generally adjusted to a pH of from about 6 to about 10 by addition of a base, such as, ammonium hydroxide or sodium hydroxide.

In one embodiment, the alumina or sulfur tolerant alumina of the present invention comprises, based on 100 pbw of the composition, from about 1 to about 30 pbw, more typically from about 5 to about 20 pbw, of a dopant selected from rare earths, Ti, Zr, and mixtures thereof, more typically selected from La, Ce, Nd, Zr, Ti, and mixtures thereof.

In one embodiment, the porous alumina of the present invention has, after calcination at 900° C. for 2 hours, or more preferably, after calcination at 1050° C. for 2 hours:

a specific surface area of from about 100 to about 500 $cm^2/g$, more typically from about 150 to about 400 $cm^2/g$, and a total pore volume of greater than or equal to 1.2 $cm^3/g$, more typically greater than or equal to 1.25 $cm^3/g$, and even more typically greater than or equal to 1.3 $cm^3/g$, wherein:

less than or equal to 50% of the total pore volume, more typically less than or equal to 40% of the total pore volume is contributed by pores having a diameter of less than 20 nm.

In one embodiment, the porous alumina of the present invention has, after calcination at 900° C. for 2 hours or more preferably, after calcination at 1050° C. for 2 hours:

a specific surface area of from about 100 to about 500 $cm^2/g$, more typically from about 150 to about 400 $cm^2/g$, and a total pore volume of greater than or equal to 1.2 $cm^3/g$, more typically greater than or equal to 1.25 $cm^3/g$, and even more typically greater than or equal to 1.3 $cm^3/g$, wherein:

less than or equal to 15% of the total pore volume, more typically less than or equal to 10% of the total pore volume, and even more typically greater than or equal to 6% of the total pore volume is contributed by pores having a diameter of less than 10 nm.

In one embodiment, the porous alumina of the present invention has, after calcination at 900° C. for 2 hours, or more preferably, after calcination at 1050° C. for 2 hours:

a specific surface area of from about 100 to about 500 $cm^2/g$, more typically from about 150 to about 400 $cm^2/g$, and a total pore volume of greater than or equal to 1.2 $cm^3/g$, more typically greater than or equal to 1.25 $cm^3/g$, and even more typically greater than or equal to 1.3 $cm^3/g$, wherein:

less than or equal to 50% of the total pore volume, more typically less than or equal to 40% of the total pore volume is contributed by pores having a diameter of less than 20 nm, and less than or equal to 15% of the total pore volume, more typically less than or equal to 10% of the total pore volume, and even more typically greater than or equal to 6% of the total pore volume is contributed by pores having a diameter of less than 10 nm.

In the sulfur tolerant embodiments of the present invention, the resultant product is a high surface area alumina particulate having silica cladding on substantially the entire surface area. Unlike prior silica treated alumina products produced by conventional impregnation techniques, the present resultant product retains its high surface area and pore volume properties (thus, showing that the present clad product does not result in deposition which cause bridging of the pores to result in pore blockages). Further, infra-red spectrum analysis of the silica clad alumina particulate shows attenuation of adsorption peak associate with the Al—OH bond relative to the untreated alumina and the appearance of silanol groups. This is indicative silica cladding present on the surface of the alumina particulate material.

The above described method for making a sulfur tolerant alumina has been found to unexpectedly achieve a support product having resistance to sulfur adsorption while retaining hydrothermal stability. Surprisingly, it has been found that the contacting of the aluminum hydrate particles with the silica precursor may be conducted in the same aqueous medium in which the aluminum hydrate particles are formed and precipitated, without first isolating the aluminum hydrate particles or otherwise separating the aluminum hydrate particles from the residues, such as alkali metal residues, of the forming and precipitating steps.

The alumina and sulfur tolerant alumina of the present invention typically exhibit a high (BET) surface area of at least about 20 $m^2/g$, such as from about 20 to about 500 $m^2/g$, typically from about 75 to 400 $m^2/g$ and more typically from 100 to 350 $m^2/g$. The silica-clad alumina particulate typically exhibit a pore volume of at least about 0.2 cc/g, such as from 0.2 to 2.5 $cm^3/g$ and typically from 0.8 to 1.7 $cm^3/g$ and an average pore diameter within the range of 50 to 1000 Angstroms, typically from 100 to 300 Angstroms. Such high surface area particulate provides ample surface area for deposition of a noble metal catalyst and having it readily contacted with the emission stream to provide effective catalytic conversion of the noxious products to more benign emission products.

The sulfur tolerant alumina embodiment of the present invention has good resistance to sulfur uptake. The uniformity and continuity of coverage of silica on the sulfur tolerant alumina embodiment of the present invention can shown through, for example, FTIR or measurement of zeta potential and can be inferred the effectiveness and efficiency of the support product to resist sulfur uptake.

The alumina or sulfur tolerant alumina of the present invention may be in the form of powder (preferred) having a average particle size of from about 1 to 200 micrometers ("μm"), typically from 10 to 100 μm; or beads having an average particle size of from 1 millimeter ("mm") to 10 mm. Alternately, the alumina particulate can be in the form of pellets or extradite (e.g. cylindrical shape). The size and particular shape being determined by the particular application contemplated.

The alumina or sulfur tolerant alumina of the present invention, especially when in the form of a powder of from 1 to 200 μm, more typically from 10 to 100 μm, can be further used as a catalytic coating on a low surface area substrate. The substrate structure can be chosen from a variety of forms for a particular application. Such structural forms include monoliths, honeycomb, wire mesh and the like. The substrate structure is normally formed of a refractory material such as, for example, alumina, silica-alumina, silica-magnesia-alumina, zirconia, mullite, cordierite, as well as wire mesh and the like. Metallic honeycomb substrates can also be used. The powder is slurried in water, peptized by the addition of a small amount of acid (typically mineral acids), and then subjected to milling to cause a reduction in particle size suitable for washcoating application. The substrate structure is contacted with the milled slurry, such as by dipping the substrate into the slurry. The excess material is removed, such as by application of blown air, followed by calcining the coated substrate structure to cause adhesion of the (wash-coat) silica clad high surface area alumina particulates of the present invention to adhere to the substrate structure.

Noble metals, usually the metals of the platinum group, such as platinum, palladium, rhodium and mixtures thereof, can be applied in manners well known to those skilled in this art either before wash-coating the silica clad alumina particulate using a suitable conventional noble metal precursor (acidic or basic), or after washcoating by dipping the wash-coated substrate in a suitable noble-metal precursor solution (either acidic or basic). More typically the alumina or sulfur tolerant alumina of the present invention is formed, followed by application of the noble metal thereto, and finally, to wash-coating the alumina supported catalyst material onto a substrate.

Additional functionality can be provided by mixing the alumina or sulfur tolerant alumina of the present invention with other oxide supports like alumina, magnesia, ceria, ceria-zirconia, rare-earth oxide-zirconia mixtures etc, and then wash-coating these products onto a substrate. The resultant catalyst can be directly loaded into canisters and the like either alone or in combination with other materials as part of the exhaust emission system of an internal combustion engine. Thus, the exhaust products, which normally comprise oxygen, carbon monoxide, carbon dioxide, hydrocarbons, nitrogen oxides, sulfur, sulfurous compounds and sulfur oxides, are passed through the exhaust system to provide contact with the noble-metal supported catalyst. The result provides conversion of the noxious and harmful exhaust products into more environmentally acceptable materials. When using a catalyst formed with a support of the present invention, one achieves a catalyst system having extended active term and of higher overall activity than would be achieved with catalysts having supports either with no silica or with silica-alumina formed from conventional co-precipitation or impregnation techniques.

It has been found that alumina sulfur tolerant alumina product of the present invention provides a support for noble-metal catalysts, which exhibit enhanced sulfur tolerance in comparison to supports having the same silica content formed by conventional impregnation or co-precipitation methods. It is well known that petroleum feed used in forming light (gasoline) and moderate (diesel) weight fuels contain sulfur and sulfur containing compounds (e.g. thiophenes and the like) as part of the feed material. Although efforts have been made to remove sulfurous materials, this is increasingly difficult to achieve with respect to fuel product streams of higher molecular weights (e.g. diesel fuels). Thus, sulfurous materials are known to be present in hydrocarbon fuels, especially in diesel fuels. The sulfurous materials present in the emission stream of hydrocarbon fuel-burning engines are known to be adsorbed by alumina and certain dopants which, in turn, cause poisoning of the noble metal residing on the support surface. The unexpected high tolerance (lack of adsorption) to sulfur that is achieved by the silica clad alumina support of the present invention permits the formation of desired catalyst for effectively treating emission product streams of internal combustion engines, especially diesel fuel engines.

The following examples are given as specific illustration of the claimed invention. It should be understood, however, that the invention is not limited to the specific details set forth in the examples. All parts and percentages in the examples and in the remainder of the specification are by weight unless otherwise specified.

Further, any range of numbers recited in the specification or claims, such as representing a particular set of properties, units of measure, conditions, physical states or percentages, is intended to literally incorporate expressly herein by reference or otherwise, any number falling within such range, including any subset of numbers within any range so recited.

Example 1 and Comparative Examples C1 and C2

Unless specified, pore size distributions, pore volume, pore diameter and BET surface areas are given by mean of Nitrogen adsorption technique. Data are collected on a Micromeretics Tristar 3000 apparatus. Pore size distribution and pore volume data are collecting using 91 measurement points between P/P0=0.01 and P/P0=0.998. Mercury pore size distribution are collected on a Micromeretics Autopore Apparatus with 103 measurement points between 0.5 psia and 30,000 psia.

The composite oxide of Comparative Example C1 comprising, on the basis of 100 pbw of the composite oxide, 80 pbw $Al_2O_3$ and 20 pbw $SiO_2$, was made using aluminum sulfate, sodium aluminate, and sodium silicate as follows. Solution A was an aqueous solution of aluminum sulfate, with a concentration of 8.31 percent by weight ("wt %"), expressed as aluminum oxide $Al_2O_3$. Solution B was an aqueous solution of sodium aluminate, with a concentration of 24.86 wt %, expressed as aluminum oxide $Al_2O_3$. Solution C was an aqueous solution of sodium silicate, with a concentration of 29.21 wt %, expressed as silicium oxide $SiO_2$. A 1 liter reactor was filled with 424 g of deionized water. The reactor contents were heated at 65° C. and this temperature was maintained along the whole experiment. 6.02 g of Solution A were introduced in the reactor under agitation over 5 minutes. The contents of the reactor were then stirred for 5 minutes without further addition of solution A. Solutions A and B were then simultaneously fed to the reactor with agitation of the reactor contents. Over the 5 first minutes of the simultaneous feeds, the respective flow rates of Solutions A and B were adjusted so the pH of the slurry increased from 3 to 7.3 during the 5 minutes. The flow rate of Solution B was then decreased until the pH is stabilized at pH 7.3. With pH stabilized at pH 7.3, Solutions A and B are added continuously over 30 minutes. After these 30 minutes at pH 7.3, the feed of Solution A is stopped and the pH of the reactor contents was allowed to increase with continued fed of Solution B. 10 minutes after discontinuing the feed of Solution A, the feed of Solution B was stopped, at which point the reactor contents exhibited a pH of 9 and a total amount of 143 g of Solution A and a total amount of 113 g Solution B had been fed to the reactor. 34.2 g of Solution C were then fed to the reactor, with continued agitation of the reactor contents. The reactor contents were then filtered and washed with deionized water at 60° C. in a Buchner funnel to form a wet filter cake. The volume of wash water was equivalent to the volume of aqueous medium in the reactor. A solution is prepared dissolving 120 g of ammonium bicarbonate per liter of water and heated to 60° C. The wet filter cake was washed with a volume of the ammonium bicarbonate solution corresponding to the volume of aqueous medium in the reactor and then washed with the same volume of deionized water at 60° C. The resulting wet filter cake was then dispersed in deionized water to obtain a slurry containing about 10 wt % of solids. The slurry was then spray dried to obtain a dried powder. The spray dried powder was then calcined at different temperatures. Specific Surface Areas ("SA"), expressed in square meters per gram ("m²/g")), Pore Volume (expressed in cubic centimeters per gram ("cm³/g")) and Average Pore Diameter (expressed in nanometers ("nm")) are reported in TABLE I below as a function of the initial calcination temperature (expressed in degrees Centigrade ("° C.")) and time (expressed in hours ("h")).

TABLE I

| Calcination Temperature (° C.)/time (h) | SA (m²/g) | Pore volume (cm³/g) | Average pore diameter (nm) |
|---|---|---|---|
| 400/1 | 500 | 1.3 | 6.5 |
| 750/2 | 400 | 1.55 | 12 |
| 1050/2 | 285 | 1.2 | 12.7 |

After calcination at 1050° C. for 2 hours, the composite oxide of Comparative Example C1 was then calcined at higher temperature. Specific Surface Areas ("SA", in square meters per gram "(m₂/g)"), pore volume (in cubic centimeters per gram ("cm₃/g")) and average pore diameter (in nanometers ("nm")) are reported in TABLE II below for each of two different secondary calcination temperatures (in degrees Centigrade ("° C.")) and times (in hours ("h")). A derivative logarithmic plot of pore size distribution after calcination at 1050° C. for 2 hours is shown in FIG. 1.

TABLE II

| Calcination Temperature (° C.)/time (h) | SA (m²/g) | Pore volume (cm₃/g) | Average pore diameter (nm) |
|---|---|---|---|
| 1150/4 | 119 | 0.64 | 16.9 |
| 1200/2 | 110 | 0.7 | 24 |

The zeta potential of the oxide of Comparative Example C1, calcined at 1050° C. for 2 hours at pH 6.5, was found to be −35 mV, whereas zeta potential measured in the same conditions for pure alumina is 10 mV and zeta potential of pure silica is −43 mV, which clearly shows the substantial impact of the silica at the surface of alumina on surface charge.

The oxide composition of Comparative Example C2 contained $Al_2O_3/SiO_2$ 80/20 wt % as oxide and was prepared as described in Comparative Example C1 except that the addition of sodium silicate was conducted at 65° C. The oxide composition of Comparative Example C2, in the form of spray dried powder, was calcined at 1050° C. for 2 hours. A portion of the calcined powder was subjected to a second calcination treatment at 1200° C. for 2 hours, after which the powder exhibited a specific surface area of 108 m²/g.

The oxide composition of Example 1 contained $Al_2O_3/SiO_2$ 80/20 wt % as oxide and was prepared as described above in Comparative Example C2, except that during the simultaneous addition of solution A (aluminum sulfate) and solution B (sodium aluminate), the pH of the reaction mixture was maintained at 4 for 33 minutes. Then solution A flow was stopped and the pH of the reaction mixture increased to 8.5. The oxide composition of Example 1, in the form of spray dried powder, was calcined at 1050° C. for 2 hours and a portion of calcined powder was subjected to a second calcination treatment at 1200° C. for 2 hours, after which the powder exhibited a specific surface area of 122 m²/g.

The Specific Surface Areas ("SA"), expressed in square meters per gram ("m²/g")), Pore Volume (expressed in cubic centimeters per gram ("cm³/g")), average Pore Diameter (expressed in nanometers ("nm")), volume fraction of pores smaller than 10 nm to the total pore volume and volume fraction of pores smaller than 20 nm, are reported in TABLE III below for the oxide compositions of Example 1 and Comparative Example C2.

Figure 2:
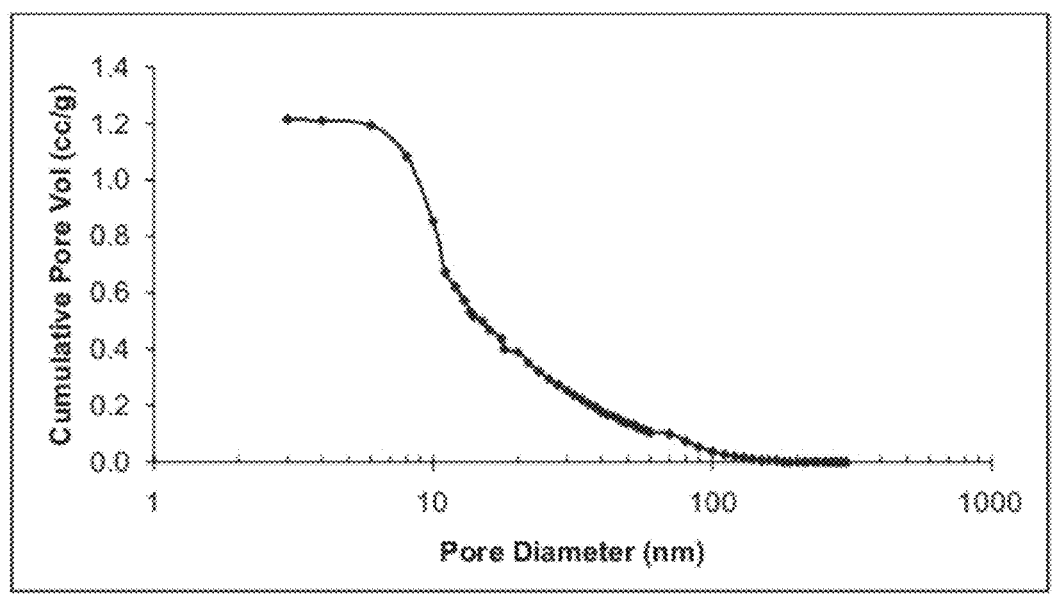
FIG. 2 shows a cumulative plot of pore size distribution, as measured by nitrogen porosimetry, for the sulfur resistant alumina composition of Comparative Example C2 after calcination at 1050° C. for 2 hours. In each case, the cumulative plots of pore size distribution provided herein show a plot of cumulative pore volume, given in $cm^3/g$ or ml/g, versus pore size (diameter or width), given in nm or microns.
Figure 3:
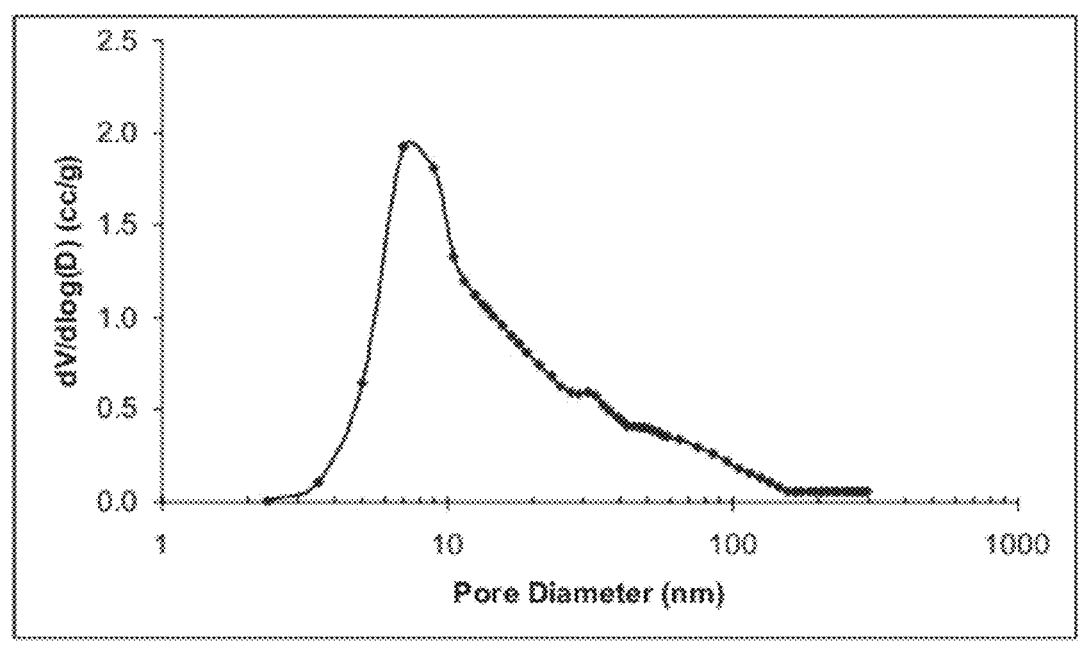
FIG. 3 shows a logarithmic derivative plot of pore size distribution, as measured by nitrogen porosimetry for the sulfur resistant alumina composition of Comparative Example C2 after calcination at 1050° C. for 2 hours.
Figure 4:
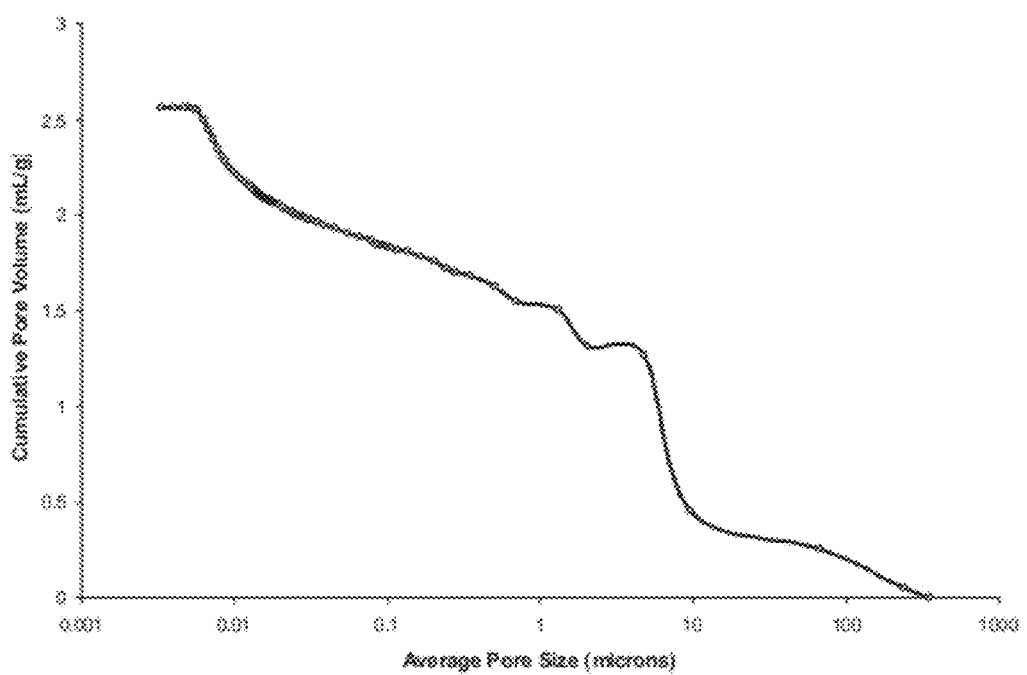
FIG. 4 shows a cumulative plot of pore size distribution, as measured by mercury porosimetry, for the sulfur resistant alumina composition of Comparative Example C2 after calcination at 1050° C. for 2 hours.
Figure 5:
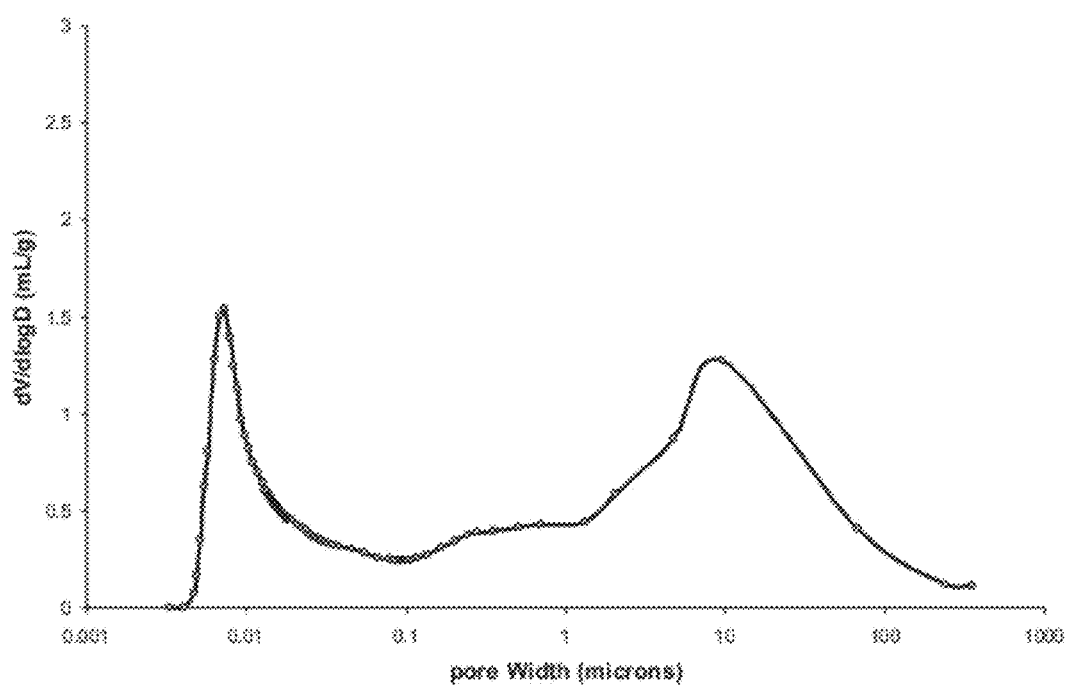
FIG. 5 shows a logarithmic derivative plot of pore size distribution, as measured by mercury porosimetry, for the sulfur tolerant alumina composition of Comparative Example C2 after calcination at 1050° C. for 2 hours.

The pore size distribution for the oxide composition of Comparative Example C2, as measured by nitrogen porosimetry after calcination at 1050° C./2 h, is shown FIG. 2 (cumulative curve) and FIG. 3 (logarithmic derivative curve). The pore size distribution the oxide composition of Comparative Example C2, as measured by mercury porosimetry after calcination at 1050° C. for 2 hours, is shown FIG. 4 (cumulative curve) and FIG. 5 (logarithmic derivative curve).

Figure 6:
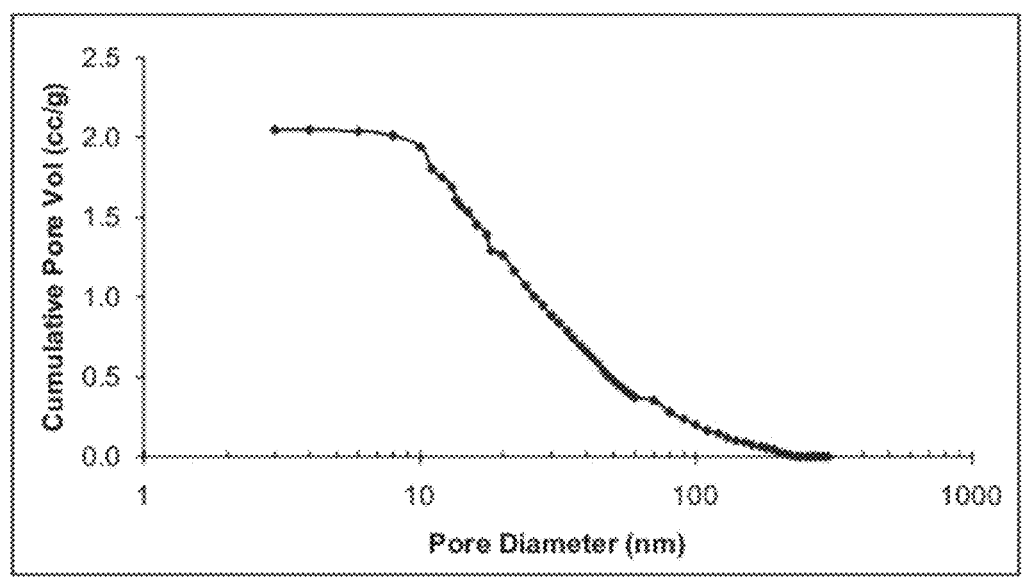
FIG. 6 shows a cumulative plot of pore size distribution, as measured by nitrogen porosimetry, for the sulfur tolerant alumina composition of Example 1 after calcination at 1050° C. for 2 hours.
Figure 7:
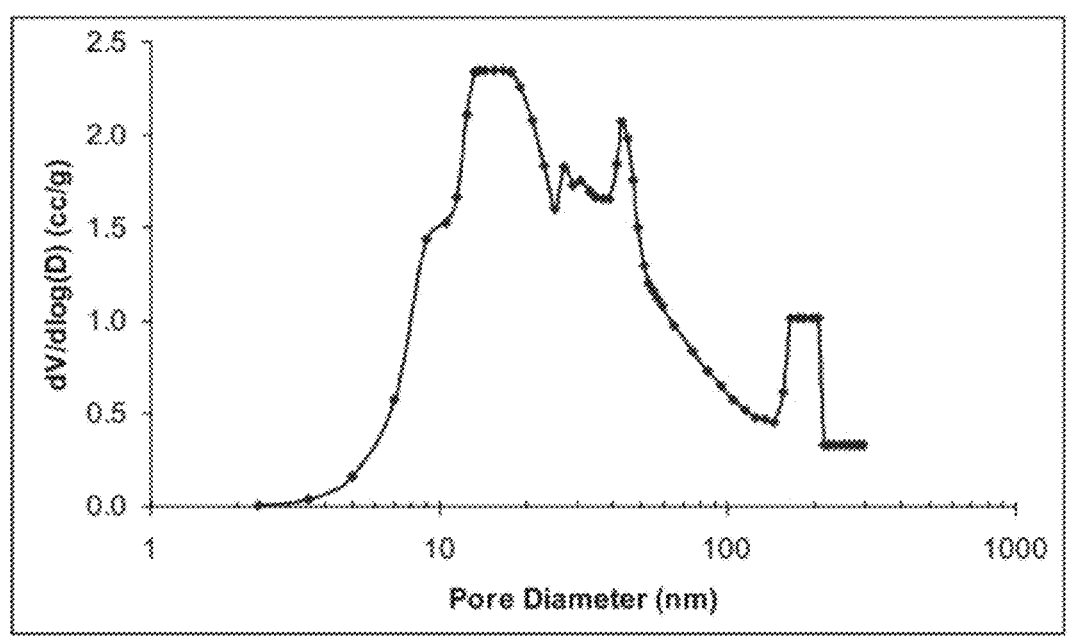
FIG. 7 shows a logarithmic derivative plot of pore size distribution, as measured by nitrogen porosimetry for the sulfur resistant alumina composition of Example 1 after calcination at 1050° C./2 hours.
Figure 8:
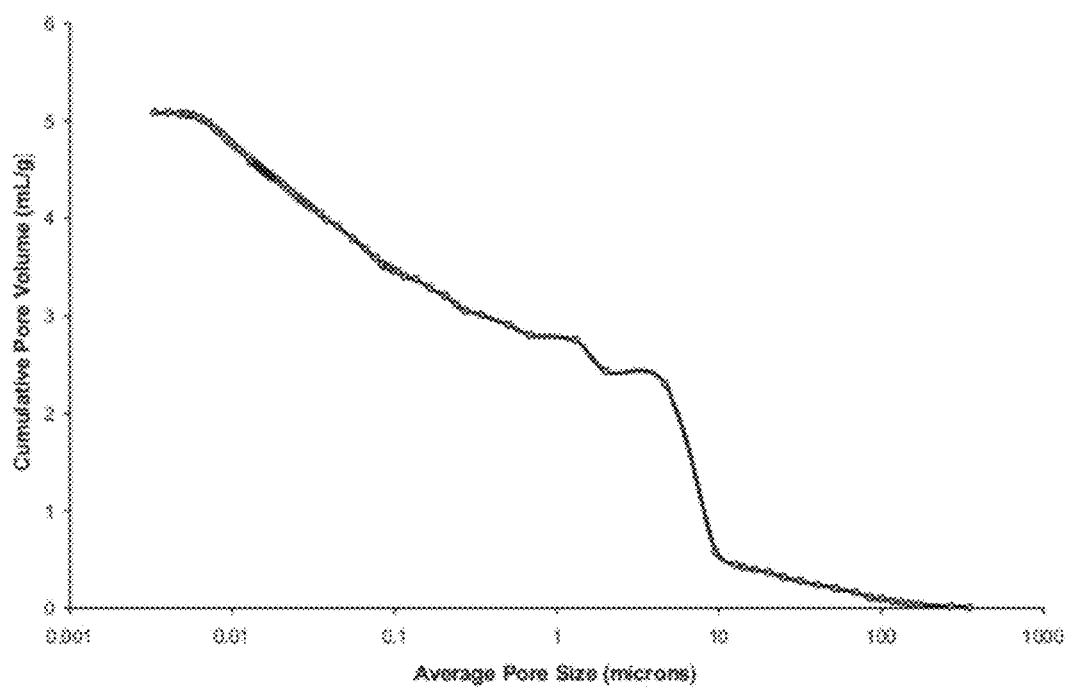
FIG. 8 shows a cumulative plot of pore size distribution, as measured by mercury porosimetry, for the sulfur resistant alumina composition of Example 1 after calcination at 1050° C. for 2 hours.
Figure 9:
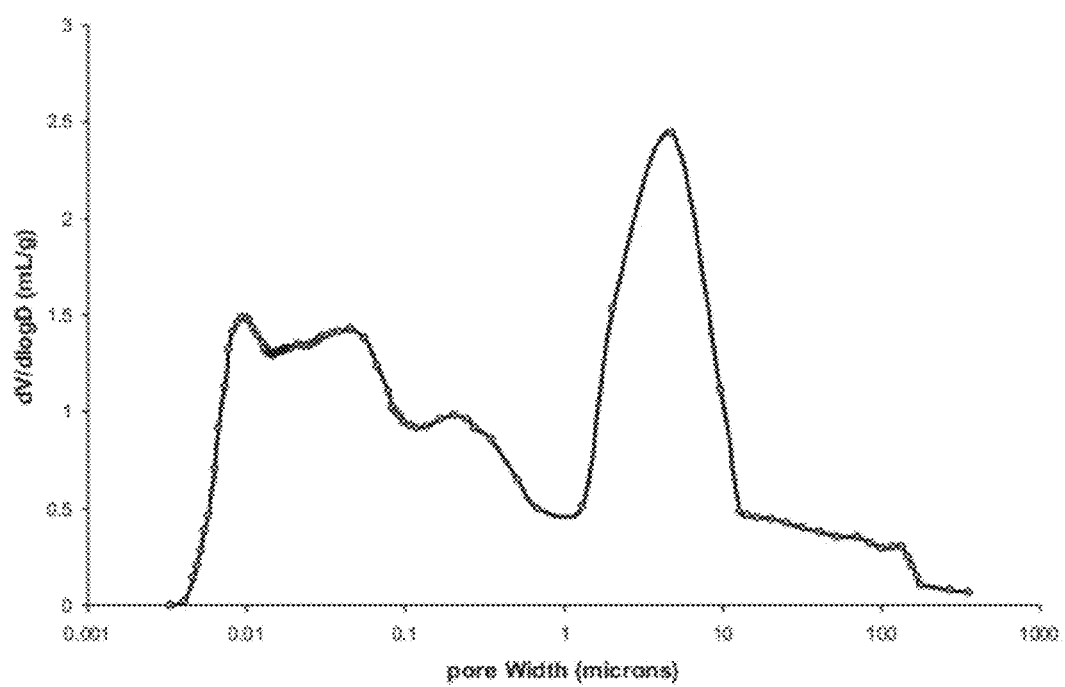
FIG. 9 shows a logarithmic derivative plot of pore size distribution, as measured by mercury porosimetry for the sulfur resistant alumina composition of Example 1 after calcination at 1050° C. for 2 hours.

The pore size distribution the oxide composition of Example 1, as measured by nitrogen porosimetry after calcination at 1050° C. for 2 hours, is shown FIG. 6 (cumulative curve) and FIG. 7 (derivative logarithmic curve). The pore size distribution the oxide composition of Example 1, as measured by mercury porosimetry after calcination at 1050° C. for 2 hours, is shown FIG. 8 (cumulative curve) and FIG. 9 (logarithmic derivative curve).

Example 2

The composite oxide of Example 2 comprising, on the basis of 100 pbw of the composite oxide, 100 pbw $Al_2O_3$, was made using aluminum sulfate, sodium aluminate, as follows. Solution A was made mixing 77 g of an aqueous solution of aluminum sulfate, with a concentration of 8.31 wt % expressed as aluminum oxide $Al_2O_3$ with 39 g of nitric acid, with a concentration of 69 wt % and 233 g of deionized water. Solution B was an aqueous solution of sodium aluminate, with a concentration of 24.86 wt %, expressed as aluminum oxide $Al_2O_3$. A 1 liter reactor was filled with 516 g of deionized water. The reactor contents were heated at 70° C. and this temperature was maintained along the whole experiment. Nitric acid was added to the reactor so the pH is adjusted to 3. Then solutions A and B were then simultaneously fed to the reactor with agitation of the reactor contents. Over the 5 first minutes of the simultaneous feeds, the respective flow rates of Solutions A and B were adjusted so the pH of the slurry increased from 3 to 5 during the 5 minutes. The flow rate of Solution B was then decreased until the pH is stabilized at pH 5. With pH stabilized at pH 5, Solutions A and B are added continuously over 30 minutes. After these 30 minutes at pH 5, the feed of Solution A is stopped and the pH of the reactor contents was allowed to increase with continued fed of Solution B. 15 minutes after discontinuing the feed of Solution A, the feed of Solution B was stopped, at which point the reactor contents exhibited a pH of 9.5 and a total amount of 350 g of Solution A and a total amount of 131 g Solution B had been fed to the reactor. The reactor contents were then filtered and washed with deionized water at 60° C. in a Buchner funnel to form a wet filter cake. The volume of wash water was equivalent to 3 times the volume of aqueous medium in the reactor. The resulting wet filter cake was then dispersed in deionized water to obtain a slurry containing about 10 wt % of solids. The slurry was then spray dried to obtain a dried powder. The spray dried powder was then calcined at 900° C. for 2 hours. Specific Surface Areas ("SA", expressed in square meters per gram ("$m^2/g$")), Pore Volume (expressed in cubic centimeters per gram ("$cm^3/g$")), average Pore Diameter (expressed in nanometers ("nm")), and contribution of pores smaller than 10 nm to the total pore volume are reported in TABLE IV below.

After calcination at 900° C. for 2 hours, the composite oxide of Example 2 was then calcined at 1100° C. for 5 hours. The surface area of the resulting sample was measured at 82 $m^2/g$.

Figure 10:
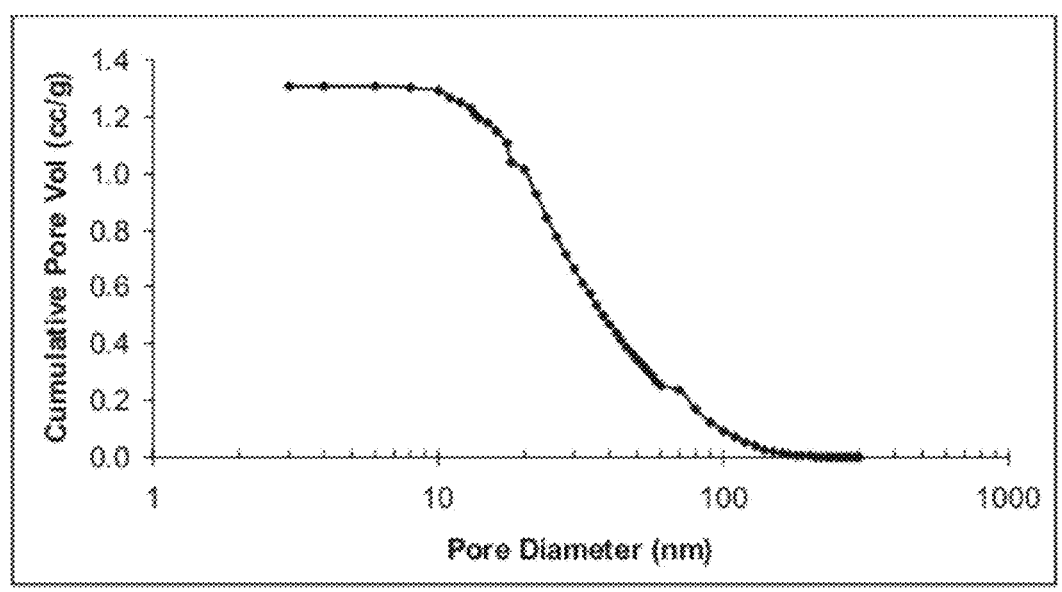
FIG. 10 shows cumulative plot of pore size distribution, as measured by nitrogen porosimetry, for the alumina composition of Example 2 after calcination at 900° C. for 2 hours.
Figure 11:
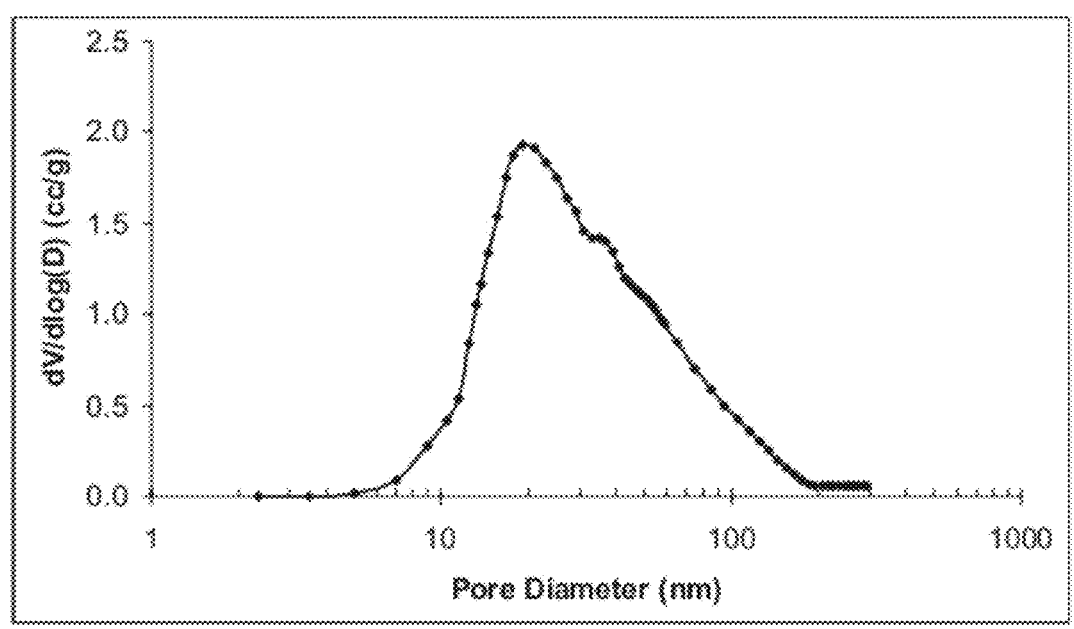
FIG. 11 shows derivative log plot of pore size distribution, as measured by nitrogen porosimetry for the alumina composition of Example 2 after calcination at 900° C. for 2 hours.
Figure 12:
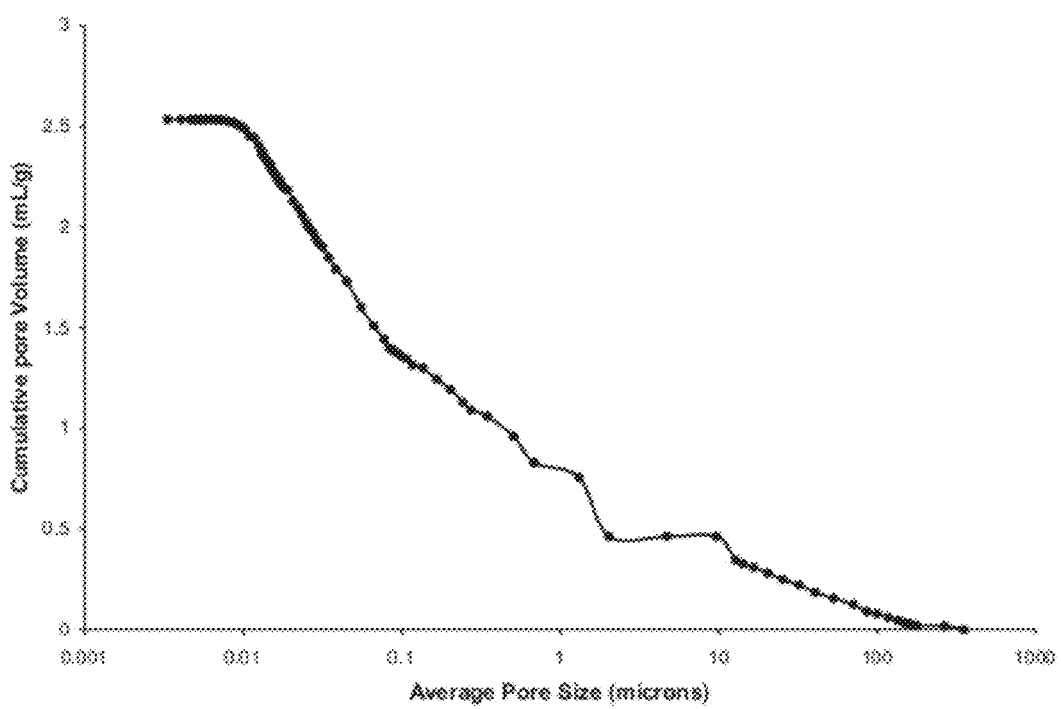
FIG. 12 shows cumulative plot of pore size distribution, as measured by mercury porosimetry, for the alumina composition of Example 2 after calcination at 900° C. for 2 hours.
Figure 13:
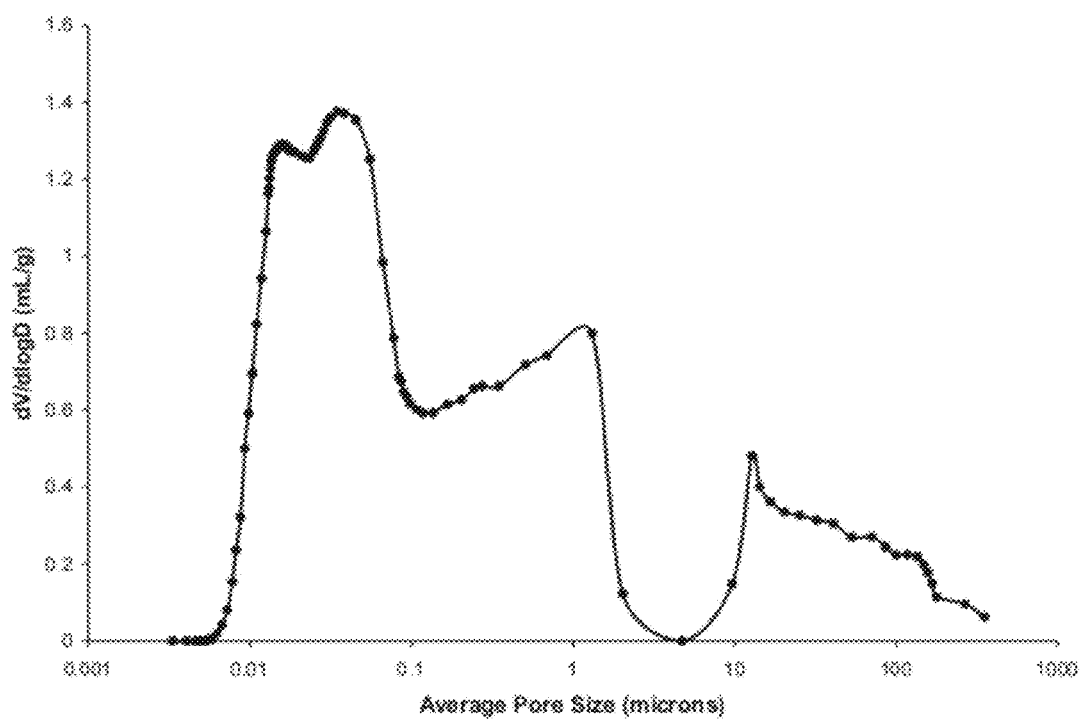
FIG. 13 shows derivative log plot of pore size distribution, as measured by mercury porosimetry for the composition of Example 2 after calcination at 900° C. for 2 hours.

The pore size distribution for the oxide composition of Example 2, as measured by nitrogen porosimetry after calcination at 900° C. for 2 hours, is shown FIG. 10 (cumulative curve) and FIG. 11 (derivative log curve). The pore size distribution for the oxide of Example 2 after calcination at 900° C. for 2 hours was also measured by mercury porosimetry as shown in FIG. 12 (cumulative curve) and FIG. 13 (derivative curve). The derivative curve, as shown in FIG. 12, shows a continuum of pore size distribution between 7 nm and 1 μm.

Example 3

The composite oxide of Example 2 comprising, on the basis of 100 pbw of the composite oxide, 96 pbw $Al_2O_3$ and 4 pbw of $La_2O_3$, was made as describe in Example 2, with the addition of aqueous lanthanum nitrate in solution A. The spray dried powder was then calcined at 900° C. for 2 hours. Specific surface area ("SA", expressed in square meters per gram ("$m^2/g$")), pore volume (expressed in cubic centimeters per gram ("$cm^3/g$")), average pore diameter (expressed in nanometers ("nm")), and contribution of pores smaller than 10 nm to the total pore volume are reported in TABLE IV below.

After calcination at 900° C. for 2 hours, the composite oxide of Example 3 was then calcined at 1100° C. for 5 hours and 1200° C. for 5 hours. The surface area of the resulting sample were measured respectively at 115 and 82 $m^2/g$.

Figure 14:
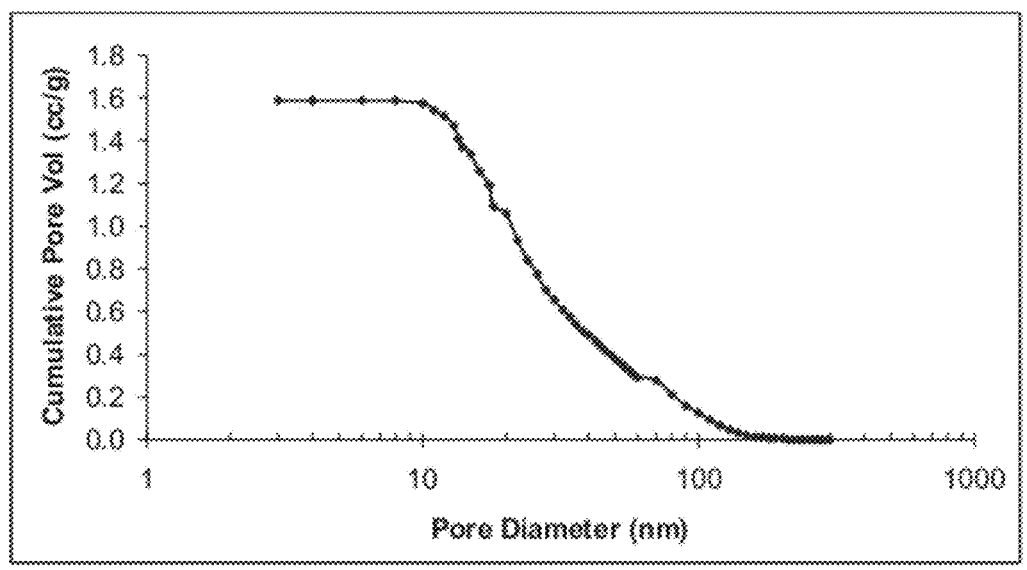
FIG. 14 shows cumulative plot of pore size distribution, as measured by nitrogen porosimetry, for the alumina composition of Example 3 after calcination at 900° C. for 2 hours.
Figure 15:
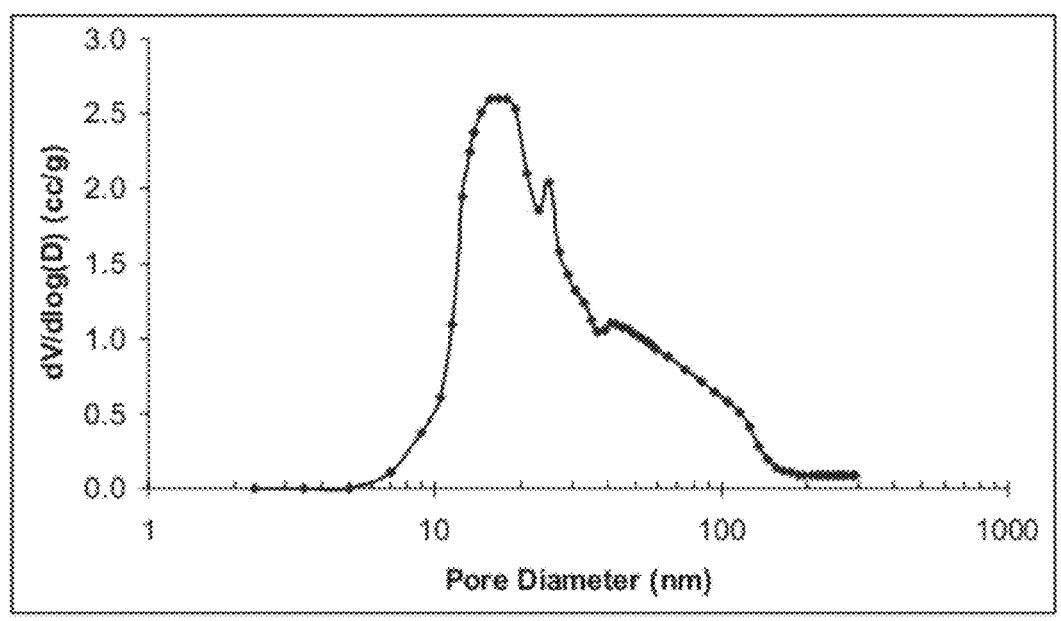
FIG. 15 shows derivative log plot of pore size distribution, as measured by nitrogen porosimetry for the alumina composition of Example 3 after calcination at 900° C. for 2 hours.
Figure 16:
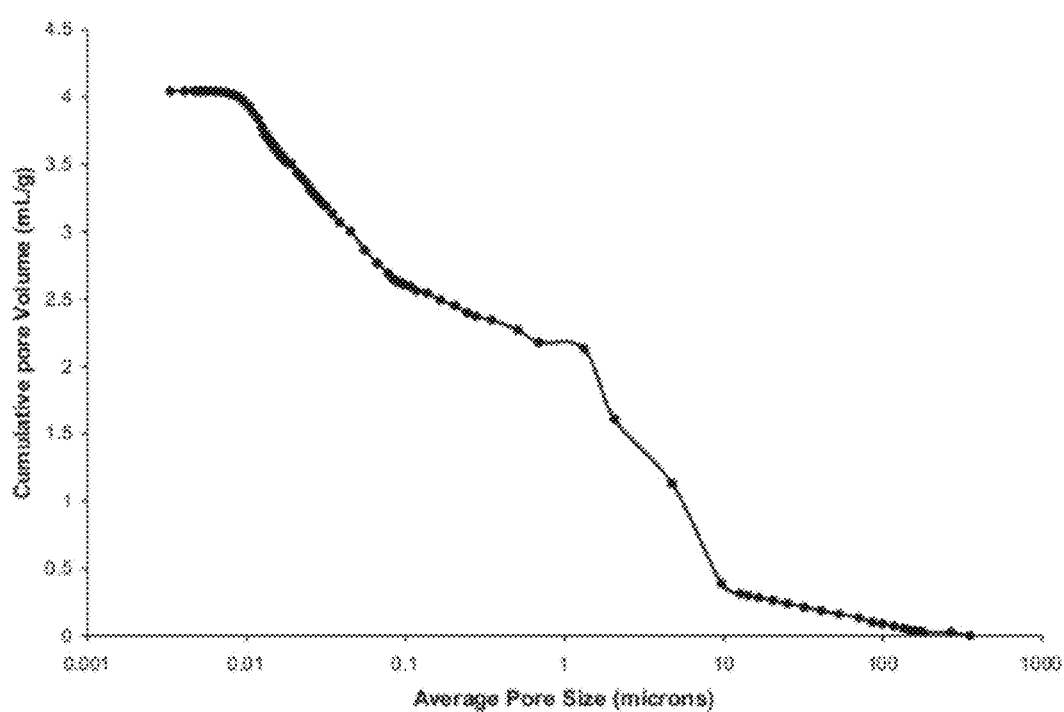
FIG. 16 shows cumulative plot of pore size distribution, as measured by mercury porosimetry, for the alumina composition of Example 3 after calcination at 900° C. for 2 hours.
Figure 17:
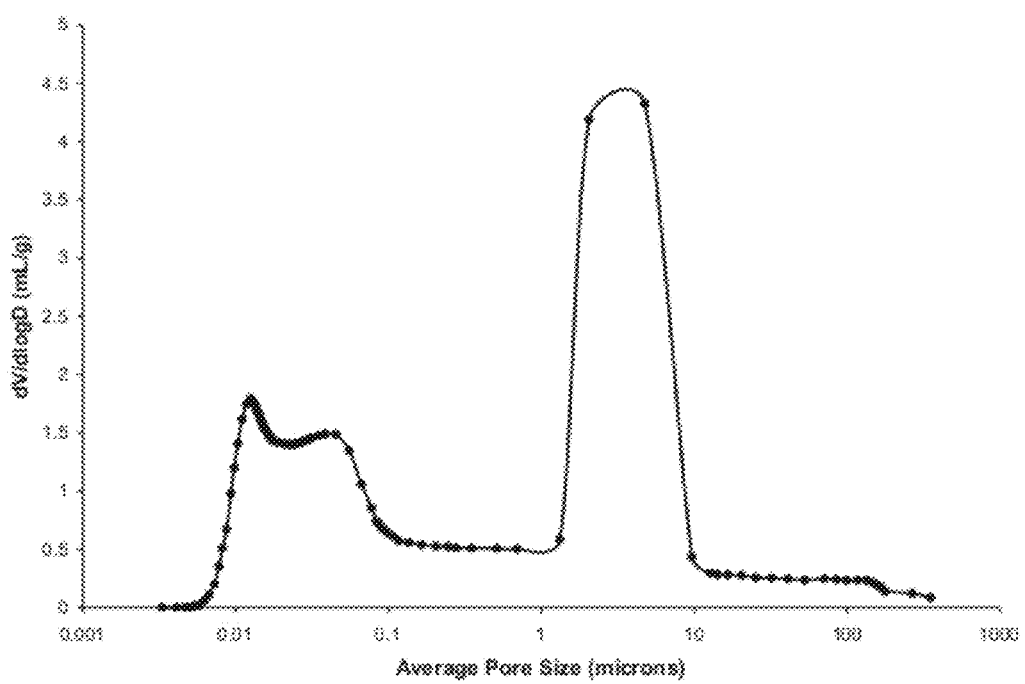
FIG. 17 shows derivative log plot of pore size distribution, as measured by mercury porosimetry for the composition of Example 3 after calcination at 900° C. for 2 hours.

The pore size distribution for the oxide composition of Example 3, as measured by nitrogen porosimetry after calcination at 900° C. for 2 hours, is shown FIG. 14 (cumulative curve) and FIG. 15 (derivative log curve). The pore size distribution for the oxide of Example 2 after calcination at 900° C. for 2 hours was also measured by mercury porosimetry as shown in FIG. 16 (cumulative curve) and FIG. 17 (derivative curve). The derivative curve, as shown in FIG. 17 shows a continuum of pore size distribution between 7 nm and 1 μm.

Comparative Examples C3-C5

The commercially available oxide of Comparative Example C3 (Siral 10) contained $Al_2O_3/SiO_2$ 90/10 wt % oxide and shows a nominal specific surface area of 283 $m^2/g$, a total pore volume of 0.65 $cm^3/g$, and an average pore diameter of 8.5 nm. The oxide composition of Comparative Example C3 was calcined at 1050° C. for 2 hours. A portion of calcined powder was subjected to a second calcination treatment at 1200° C. for 2 hours, after which the powder exhibited a specific surface area of 101 $m^2/g$.

The commercially available oxide of Comparative Example C4 contained $Al_2O_3/SiO_2$ 70/30 wt % oxide (Siral 30) and shows a nominal specific surface area of 466 $m^2/g$, a total pore volume is 0.74 $cm^3/g$, and an average pore diameter of 5.7 nm. The oxide composition of Comparative Example C4 was calcined at 1050° C. for 2 hours. A portion of calcined powder was subjected to a second calcination treatment at 1200° C. for 2 hours, after which the powder exhibited a specific surface area of 59 $m^2/g$.

The oxide composition of Comparative Example C5 contained $Al_2O_3/SiO_2$ 90/10 wt % as oxide and was made, in accord with the process disclosed in U.S. Patent Publication No. US2007/019799, as follows. 48.37 g of non-doped boehmite alumina (Grace Davidson Grade MI-107, nominally 65.1% oxide) were dispersed in 289.6 g of deionized water at room temperature to form an alumina slurry. 11.98 g of a solution of sodium silicate (concentration 29.21% as $SiO_2$) were then added progressively to this slurry. The resulting mixture was heated at 95° C. and maintained at this temperature for 30 minutes. Nitric acid was added until the pH decreased to 7.1. The slurry was then cooled to 80° C., washed with 600 ml of a solution of ammonium bicarbonate at 65° C. then washed with de ionized water et 65° C. The resulting wetcake was then dispersed in water at a concentration of 10% by weight as oxide. This slurry was spray dried to form a powder. The oxide composition of Comparative Example C5, in the form of a spray dried powder, was calcined at 1050° C. for 2 hours.

The specific surface area, pore volume and average pore diameter for the calcined powder were measured by $N_2$ porosimetry, as well as the volume fraction contributed by pores smaller than 10 nm and smaller than 20 nm to the total pore volume, are reported in TABLE II below for the oxide compositions of Examples 2 and 3 and Comparative Examples C3, C4, and C5.

TABLE III

Properties after Calcination at 1050° C. for 2 hours

| Ex# | Specific surface area ($m^2/g$) | Specific pore volume ($cm^3/g$) | Average pore diameter (nm) | Pore volume fraction contributed by pores <10 nm (%) | Pore volume fraction contributed by pores <20 nm (%) |
|---|---|---|---|---|---|
| 1 | 306 | 2.05 | 18.8 | 5 | 38 |
| C2 | 305 | 1.21 | 10.6 | 30 | 68 |
| C3 | 160 | 0.68 | 12.3 | 10 | 78 |
| C4 | 196 | 0.56 | 8.1 | 44 | 80 |
| C5 | 213 | 0.84 | 10.9 | 26 | 67 |

TABLE IV

| | Properties after Calcination at 900° C. for 2 hours | | | | |
|---|---|---|---|---|---|
| Ex# | Specific surface area 900° C./2 h (m²/g) | Specific pore volume (cm³/g) | Average pore diameter (nm) | Pore volume fraction contributed by pores <10 nm (%) | Pore volume fraction contributed by pores <20 nm (%) |
| 2 | 171 | 1.31 | 23 | 1 | 22 |
| 3 | 215 | 1.59 | 21.4 | 1 | 33 |

The invention claimed is:

1. A method for making a high surface area, high pore volume porous alumina, the method comprising:
   forming a slurry of aluminum hydrate particles in an aqueous medium by simultaneously feeding streams of aqueous aluminum sulfate and aqueous sodium aluminate into a reaction vessel at a temperature of from 60° C. to 100° C. while maintaining the pH between about 4 and less than 6 for at least 30 minutes,
   adjusting the pH of the slurry of aluminum hydrate particles in the aqueous medium to a pH of from about 8 to less than 11,
   isolating aluminum hydrate particles from the aqueous medium at the pH of from about 8 to less than 11,
   drying the isolated aluminum hydrate particles,
   calcining the dried aluminum hydrate particles to form the high surface area, high pore volume porous alumina,
wherein the high surface area, high pore volume porous alumina has a specific surface area of from about 100 to about 500 square meters per gram and a total pore volume after calcination at 900° C. for 2 hours of greater than or equal to 1.2 cubic centimeters per gram, wherein less than or equal to 15% of the total pore volume is contributed by pores having a diameter of less than 10 nanometers.

2. The method of claim 1, further comprising contacting the aluminum hydrate particles with a water soluble silica precursor in the aqueous medium.

3. The method of claim 2, wherein the amount of water soluble silica precursor is sufficient to provide a porous alumina product having from a silica content of from about 1 to about 40 parts by weight silica per 100 parts by weight of the porous alumina.

4. The method of claim 1, further comprising adding a dopant precursor to the aqueous medium during the step of forming the slurry of aluminum hydrate particles in the aqueous medium.

5. The method of claim 1, wherein the high surface area, high pore volume porous alumina has, after calcination at 900° C. for 2 hours, a total pore volume of greater than or equal to 1.25 cubic centimeters per gram.

6. The method of claim 1, wherein, after calcination at 900° C. for 2 hours, less than or equal to 10% of the total pore volume of the high surface area, high pore volume porous alumina is contributed by pores having a diameter of less than 10 nanometers.

7. The method of claim 1, wherein, after calcination at 900° C. for 2 hours, less than or equal to 50% of the total pore volume of the high surface area, high pore volume porous alumina is contributed by pores having a diameter of less than 20 nanometers.

8. The method of claim 1, wherein, after calcination at 900° C. for 2 hours, less than or equal to 40% of the total pore volume of the high surface area, high pore volume porous alumina is contributed by pores having a diameter of less than 20 nanometers.

9. The method of claim 1, wherein the high surface area, high pore volume porous alumina comprises alumina and silica, in relative amounts, expressed as parts by weight of the respective oxides of the discrete elements per 100 parts by weight of the combined amount of respective oxides of the discrete elements of the porous alumina,
   from about 60 to about 98 parts by weigh aluminum oxides,
   from about 2 to about 40 parts by weigh silicon oxides, and
optionally, further comprises one or more dopants selected from transition metal oxides and rare earth oxides.

10. The method of claim 9, wherein the high surface area, high pore volume porous alumina comprises a dopant selected from transition metal oxides, rare earth oxides, and mixtures thereof, in an amount of from 0.1 to 20 parts by weight of the dopant per 100 parts by weight of aluminum oxide.

11. The method of claim 10, wherein the dopant comprises lanthanum oxide.

* * * * *